Oct. 22, 1940.  T. W. KENYON  2,218,929

DEVIOMETER

Filed March 12, 1936  7 Sheets-Sheet 1

Witness
Paul F. Bryant

Inventor
THEODORE W. KENYON
BY Herbert H. Thompson
HIS ATTORNEY.

Oct. 22, 1940.　　　T. W. KENYON　　　2,218,929
DEVIOMETER
Filed March 12, 1936　　　7 Sheets-Sheet 2

Witness
Paul F. Bryant

Inventor
THEODORE W. KENYON.
BY Herbert H. Thompson
HIS ATTORNEY.

Oct. 22, 1940.　　　T. W. KENYON　　　2,218,929
DEVIOMETER
Filed March 12, 1936　　　7 Sheets-Sheet 3

Witness
Paul F. Bryant

Inventor
THEODORE W. KENYON
BY Herbert H. Thompson
HIS ATTORNEY

Oct. 22, 1940.   T. W. KENYON   2,218,929
DEVIOMETER
Filed March 12, 1936   7 Sheets-Sheet 4

Witness
Paul F. Bryant

Inventor
THEODORE W. KENYON
BY Herbert H. Thompson
HIS ATTORNEY.

Oct. 22, 1940.  T. W. KENYON  2,218,929
DEVIOMETER
Filed March 12, 1936  7 Sheets-Sheet 6

Witness
Paul F. Bryant

Inventor
THEODORE W. KENYON
BY Herbert H. Thompson
HIS ATTORNEY

Oct. 22, 1940.  T. W. KENYON  2,218,929
DEVIOMETER
Filed March 12, 1936   7 Sheets-Sheet 7

INVENTOR
THEODORE W. KENYON
BY
Herbert H. Thompson
HIS ATTORNEY.

Patented Oct. 22, 1940

2,218,929

UNITED STATES PATENT OFFICE 2,218,929

DEVIOMETER

Theodore W. Kenyon, Huntington, N. Y., assignor to Sperry Gyroscope Company, Inc., Brooklyn, N. Y., a corporation of New York Application March 12, 1936, Serial No. 68,392

22 Claims. (Cl. 33—204)

The present invention relates to flight or attitude indicators for aircraft wherein the course or change of course of the craft is indicated and, preferably, also the attitude of the craft, at least in elevation. At present, two separate instruments are utilized to perform these functions, namely, the directional gyroscope for course and course changes and the gyroscopic horizon for pitch. My invention not only combines the functions of these two instruments, but possesses the marked superiority over either of them that it is not disturbed or rendered temporarily inoperative by stunting maneuvers.

More particularly, my invention constitutes an improvement on the type of indicator or deviometer disclosed in my prior applications for Methods and means for indicating deviations of craft, Serial Nos. 736,565 and 736,566, filed July 23, 1934.

One object of the present invention is to improve on indicators of this type, whereby the total course change of the craft may be indicated to better advantage on a separate dial. By the present invention I have also greatly improved the operating motors which operate the deviometer at a rate proportional to the total precession of the gyroscopes with a high degree of accuracy, whereby, by integrating the movements thereof with respect to time, the device performs the function of a directional gyroscope. According to the present invention, I employ small hydraulic motors for operating such means, controlled by a piston valve connected to the two gyroscopes, and I preferably immerse the entire apparatus in a thin oil so that minor leaks in the system become unimportant.

A further improvement is the addition of a direct pendulum operated pitch indicator which is used in connection with the background indicators to show the amount of pitch or inclination.

A further improvement is the substitution of an endless belt traveling backgrounds in place of the light projection device of the prior applications.

Further improvements will become apparent from the following description and claims.

Referring to the drawings, showing several forms my invention may assume.

As in my prior applications, I employ a plurality of gyroscopes, each having two degrees of freedom, which are caused to precess upon turning of the craft about one axis through an angle proportional to the rate of turn. Thus, I employ one such gyroscope responsive to turning of the craft in azimuth and another such gyroscope responsive, say, to pitching of the craft, that is, turning about a transverse axis in elevation. Obviously, if desired, a third gyroscope could be employed, responsive to roll of the craft.

Figure 2:
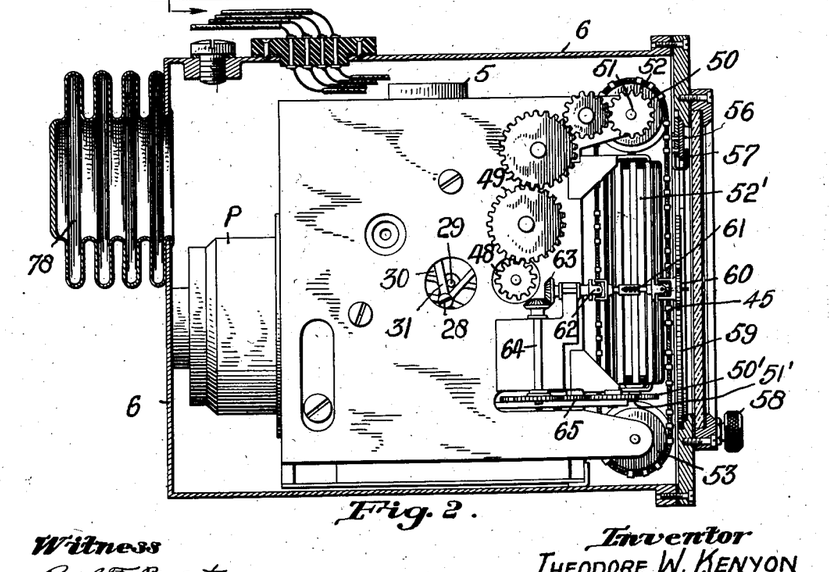
Fig. 2 is a side elevation of the same, the outer casing being shown in section.
Figure 3:
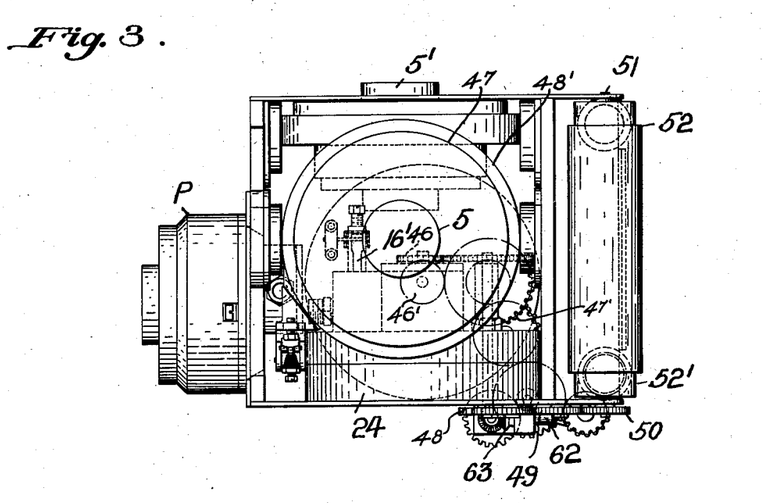
Fig. 3 is a top or plan view of the operating portion of the mechanism.
Figure 7:
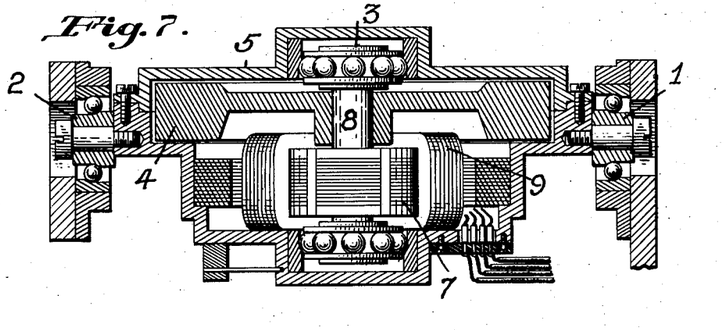
Fig. 7 is a vertical section, on a larger scale, of one of the gyroscopes employed.
Figure 8:
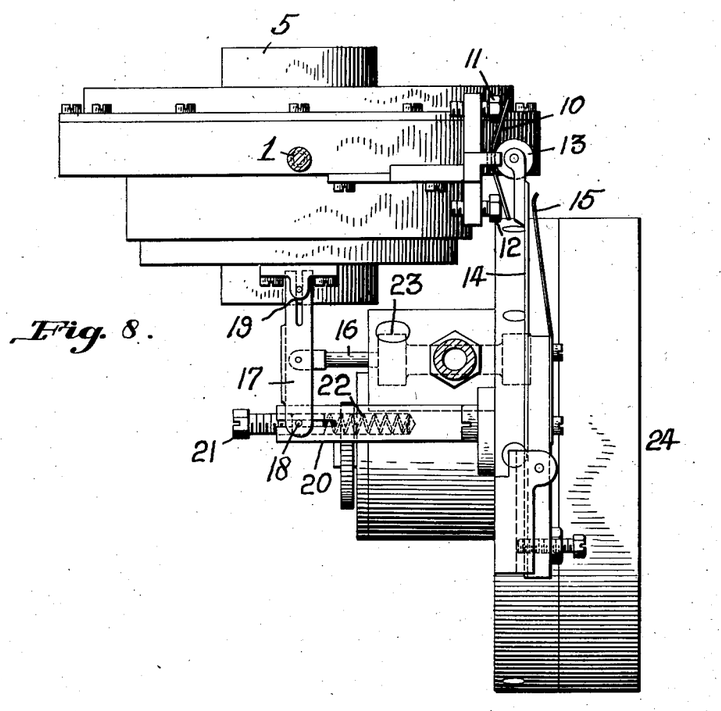
Fig. 8 is a side elevation of the same.
Figure 9:
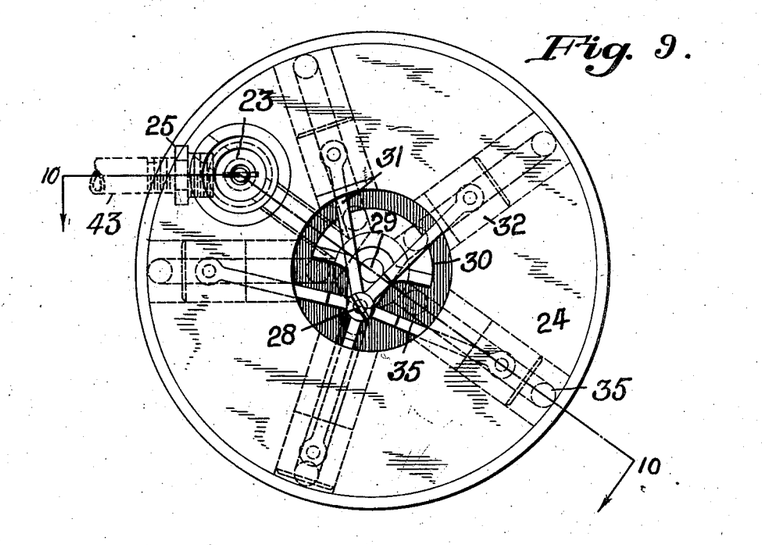
Fig. 9 is a face view of one of the small hydraulic engines which operate the mechanism, on an enlarged scale.

One of such gyroscopes 5 is shown in Figs. 7 and 8. If this is the pitch indication gyroscope, the trunnion axis 1—2 would be mounted fore and aft on the craft with the spin axis 3 of the rotor 4 normally vertical so that, upon pitch, the gyroscope would precess out of the plane of the paper in Fig. 7. The rotor is shown as journaled in casing 5, which is preferably made liquid-tight since the outer casing 6 of the instrument is preferably filled with oil. An expansion chamber is shown at 78, (Fig. 2). The rotor is shown as spun electrically by means of a squirrel cage armature 7 mounted on the shaft 8 of the rotor, which is driven by polyphase induction winding 9 within the casing.

The gyroscope is yieldingly held centralized by any suitable spring means. In Fig. 8 such means is shown as comprising a U-shaped strip 10, the curve of which may be adjusted by the screws 11 and 12 on which its ends rest. On said piece bears a roller 13 held by a spring arm 14 so that when the gyro precesses around the axis 1—2, a yielding force will be exerted to return it to its normally vertical position. An extra spring 15 may be employed, the end of which is slightly spaced from the spring 14, so that the spring pressure is increased as the gyroscope precesses further away from its central position.

As the gyroscope precesses, it actuates a valve rod 16, said rod being shown as pinned to a lever 17 pivoted at 18 and having a pin and slot connection 19 with the gyroscope. For adjustment purposes, the pivot 18 is shown as adjustably mounted in a bracket 20 by means of a set screw 21 and take-up spring 22 so that the valve may be set in the proper position with respect to the gyroscope.

Figures 10, 11:
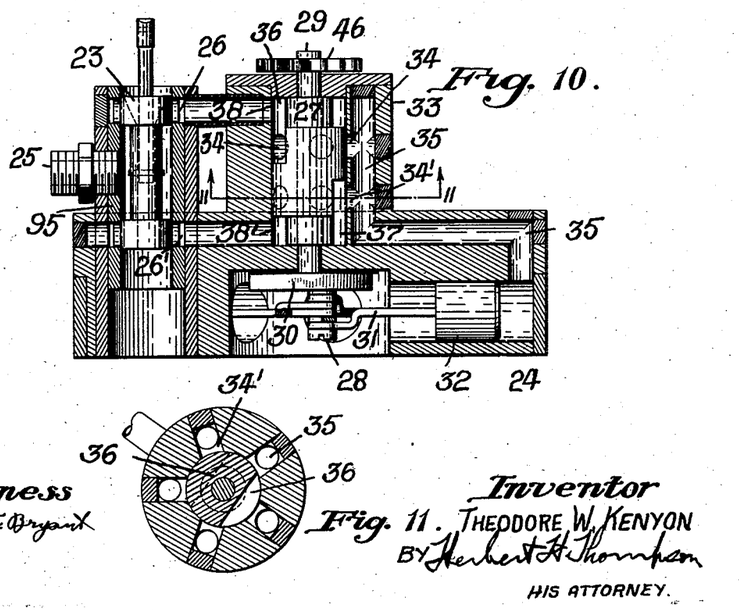
Fig. 10 is a section taken approximately on line 10—10 of Fig. 9.
Fig. 11 is a transverse section taken approximately on line 11—11 of Fig. 10.

Said valve may be in the form of a cylinder valve 23 (see Fig. 10) which controls the operation of the tiny hydraulic multi-cylinder engine 24. (These figures are approximately double scale.) With the valve in the central position shown in Fig. 10, the engine is at rest. If the valve be moved upwardly in this figure, the oil entering through pipe 25 will pass through port 26 into the upper end of distributing valve 27 and drive the engine in one direction, while if the valve be moved downwardly, the port 26' will be opened and oil enter the lower end of the distributing valve to drive the engine in the opposite direction. The engine is shown as a radial reciprocating engine having five cylinders in this instance, the five pistons being connected to a common crank pin 28 on crank shaft 29, which is counter-balanced by the counter-weight 30 which counter-balances the connecting rods 31 and pistons 32 as well. The distributing valve is preferably double ended so as to supply the actuating liquid to the cylinders in either rotational direction. It is shown as housed within a cylindrical housing 33 which has arranged around the same five pairs of ports 34 and 34'. The two ports of each pair 34 and 34' are axially spaced but in the same radial plane, and both lead through transverse passages 35 to the respective cylinders. The distributing valve is shown as having a cut-out portion 36 at its upper end and a second cut-out portion 37 at its lower end and circumferentially spaced 180° from portion 36, which act to connect, in one instance, the intake port 38, connected to port 26, with the upper series of ports 34 in turn, while cut-out portion 37 acts in the same manner to connect intake port 38' with the lower series of ports 34' in turn, thus driving the engine in either direction dependent on the position of valve 23. As shown in Fig. 11, there may be one, two or three pistons operating at the same time, so that excellent efficiency is secured. The valves also return the oil to the pump through the opposite ports from the ones being used for the incoming oil, the oil supply discharging into the casing from either open end of housing 95 of valve 23.

Figures 12, 13, 14:
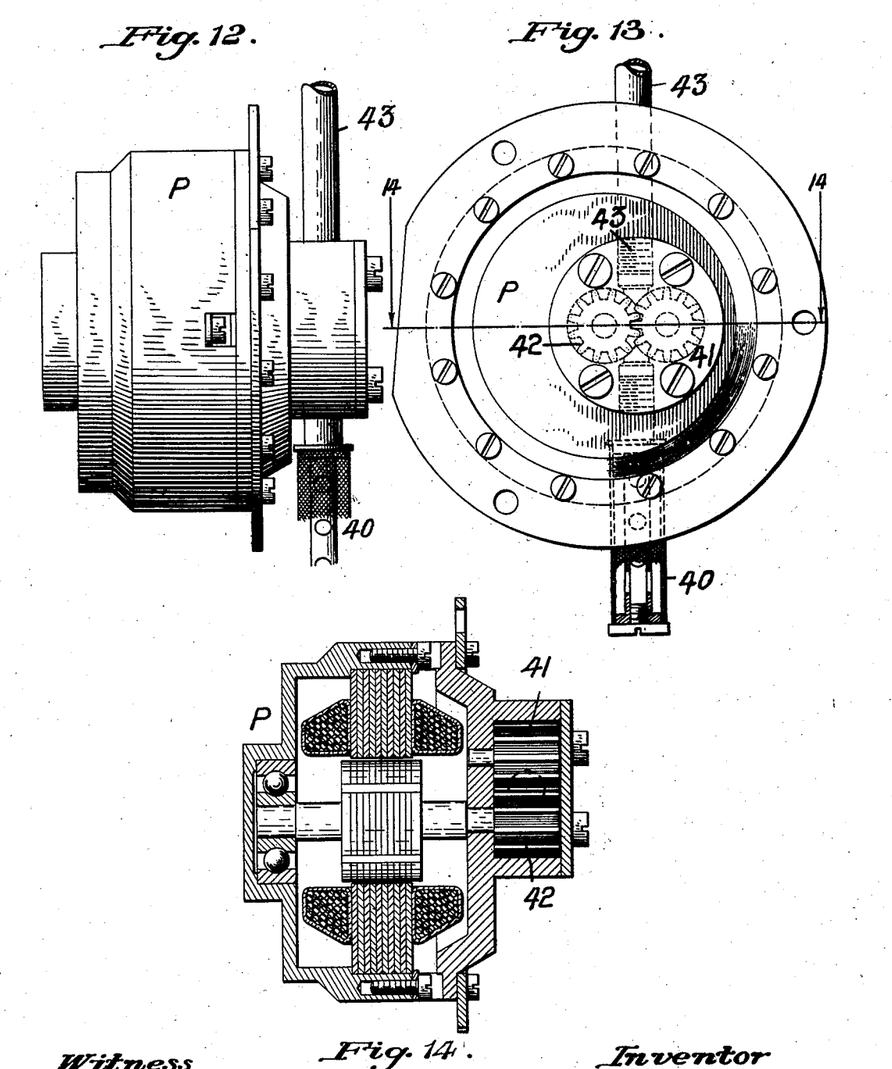
Fig. 12 is a side view of the oil pump which supplies pressure for driving the engines.
Fig. 13 is a face view thereof.
Fig. 14 is a section taken on line 14—14 of Fig. 13.

Oil is supplied to the engines from any suitable form of pump, such as the electrically driven gear pump P shown in Figs. 12 to 14. In this case the oil is drawn into the pump through the screen 40 and is pumped by the intermeshing gears 41, 42 out through pipe 43 to the several engines employed.

Figure 4:
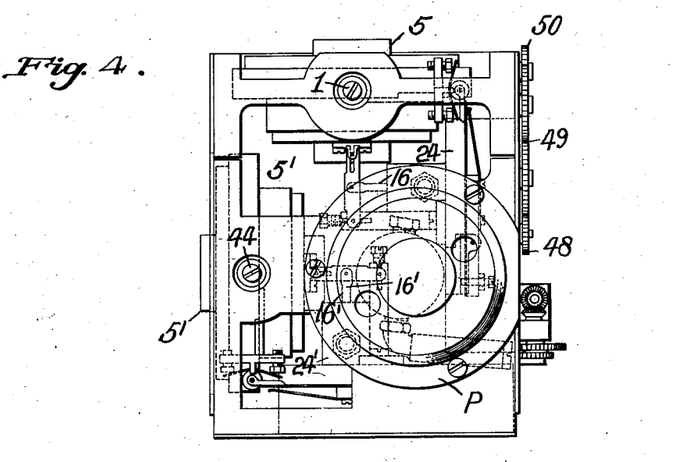
Fig. 4 is a rear view of the same.
Figure 5:
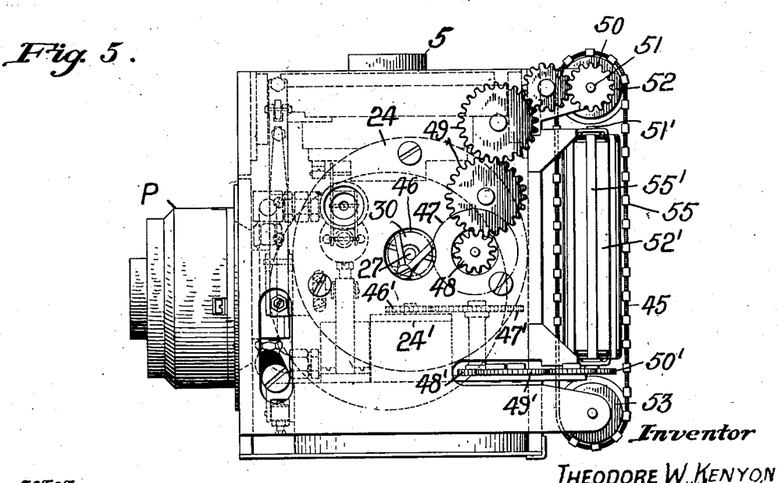
Fig. 5 is a side elevation of the same from the side opposite Fig. 2.
Figures 6, 19:
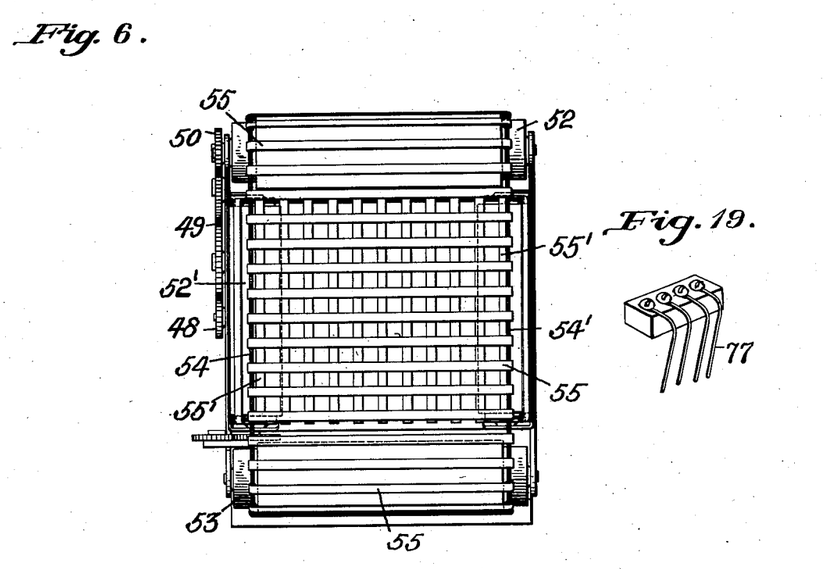
Fig. 6 is a front view of the same.
Fig. 19 is a detail of the lead-in spring wires for driving the motor of the gyroscope.

In Figs. 4 and 5 the pitch gyroscope is shown at 5 and the azimuth gyroscope at 5', the latter being shown as mounted on horizontal trunnions 44 extending fore and aft on the craft, with a transverse spinning axis. The engine for gyroscope 5 is indicated at 24', the valve rod being at 16, while the engine for the azimuth gyro is shown at 24' and the valve rod at 16'. The former engine, 24, is shown as driving an endless belt 45 through the pinion 46 on the crank shaft 29 which meshes with a larger gear 47 on the shaft of which is pinion 48, driving through a succession of intermediate gears 49 a pinion 50 on the shaft 51 of a roller 52, over which the belt 45 passes. The belt also passes around a lower idling roller 53. Said belt is shown as in the form of a pair of spaced cords or small cables 54, 54' having transverse spaced bars 55 connecting the same to form slats or a "picket fence" effect when revolved. Similarly, the engine 24' drives a corresponding roller 52' at one side of the instrument through pinion 46' on the crank shaft and gear 47', pinion 48', and similar gearing 49', which rotates the pinion 50' on the shaft 51' of roller 52'. Said belt may be similarly constructed with vertically extending slats 55' and is shown as placed within the endless belt 45, so that the front view of the instrument appears as shown in Fig. 6.

Figure 1:
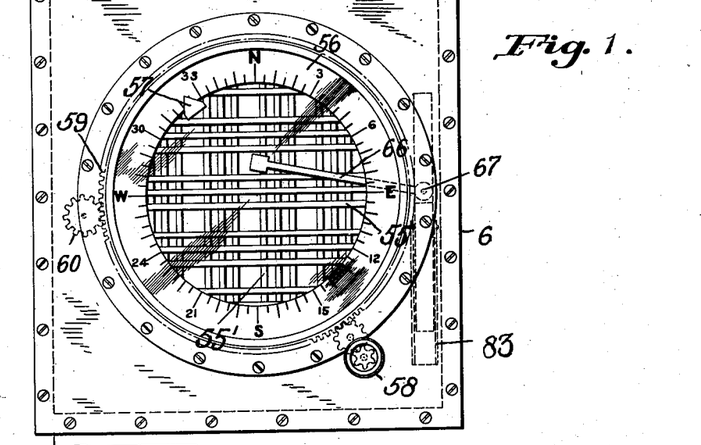
Fig. 1 is a front elevation of my deviometer, full scale.
Figure 15:
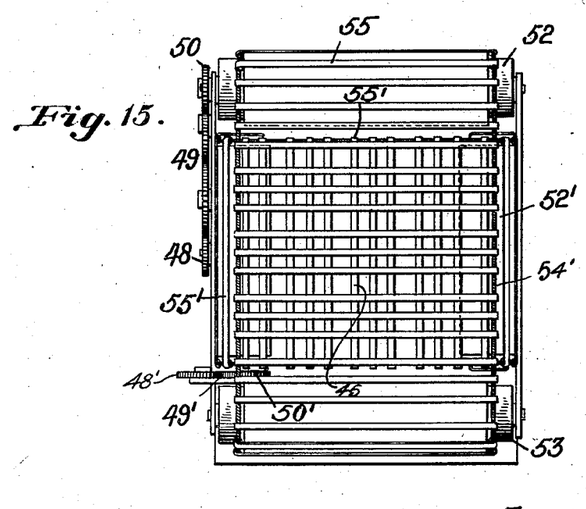
Fig. 15 is a face view of the form of the invention shown in Fig. 1, which is somewhat different from the forms shown in Figs. 4 and 5.

Fig. 1 shows how the face of the instrument appears with the outer casing applied. In this figure the spacing of the cross slats is slightly modified, being placed in groups of three so as to facilitate counting the same as they move across the face of the instrument, for the purpose hereinafter explained. This modification is shown also in Fig. 15, with the cover removed.

The arrangement is such that the background cross bars move in the direction that points on the real horizon appear to move upon turning and pitching of the craft, and at a rate proportional to the rate of turn. If both angular movements occur together, both belts move at the proper rate so that a true representation of the apparent horizon movement under such circumstances is still obtained.

With the construction so far described, the aviator is furnished with a means for showing not only deviation from course or level flight, but also is furnished with a fair estimate of the rate of deviation and of the amount of deviation. The cross bars on the belt move at an exact rate proportional to the rate of turn of the aircraft during the turn, and their speed of movement gives the aviator an estimate of the rate at which he is turning. In my invention, however, I employ no scale or other indicator showing the rate of turn as a quantity, which characterizes the commercial turn indicator. Also, by counting the bars as they move across the face, the aviator may obtain an exact index of the extent of course change.

I prefer, however, to supplement this means by a course indicator or compass card shown at 56, 57 in Fig. 1. As shown, the dial 56 is normally stationary and is read in connection with a pointer or index 57 which is moved in accordance with the amount of deviation of the aircraft. If originally set on the true compass directions, as by means of the push knob 58, the device may therefore be used as a compass and becomes, in effect, a form of directional gyroscope. The pointer 57 is shown as driven from an annular gear 59 mounted under the graduated or bezel ring 56 (see Fig. 2) and to which the pointer is secured. Said ring is turned from a pinion 60 which is shown as driven through universal couplings 61 and 62 from a bevel gear 63 which, in turn, is driven from a cross shaft 64. Said shaft may be driven directly from the pinion 50' which rotates the roller 52', through intermediate gearing 65, and the gearing is arranged with respect to the speed of the engines so that the angular movement of the pointer 57 is equal to the deviation of the craft in azimuth from the original course. In other words, the total movement is shown as an angle equal to the course change, the rate of movement being of course much less than that of the cross bars 55', due to reduction gears 60, 59, etc.

For showing the amount of pitch, I prefer to employ a separate indicator in the form of a normally horizontal bar 66 pivoted at 67 and extending at least part way across the face of the instrument. Said bar is secured to a sleeve 80 journaled on a shaft 67 mounted in a fixed bracket 81. The bar is shown as bent downwardly and around the side of the bracket 81, as indicated at 82. Below the same there is a small pendulous bell crank lever 83 pivoted at 84, having an arm 85. The motion of said pendulum is transmitted to the bar 66 through a miniature chain or cord 86, one end of which is secured to the arm 85 and the other end to the sleeve 80. The sleeve is normally biased in one direction by a coil spring 87 which takes up the slack in the chain and rotates the sleeve in case the pendulum moves to the right in Fig. 16. The pendulum may be damped as by means of a piston or ball 88 which is connected to the bell crank arm 85 through link 89, and which is mounted within a close fitting cylinder 90. Normally, the pendulum 83 hangs vertically, which holds the bar 66 horizontal, but in case of upward pitch or climbing of the craft, for instance, the pendulum will swing in the direction shown in Fig. 16 and move the bar upwardly, as shown in Fig. 1. Similarly, downward pitch will cause reverse movement. Limit stops are provided to prevent the bar from swinging out of the field of vision. In one direction the contact of the pendulum bob with the screw 91 acts as a stop, while in the other direction contact of the curved portion 82 of the bar 66 with the screw head 92 acts as a stop.

Figures 16, 17, 18:
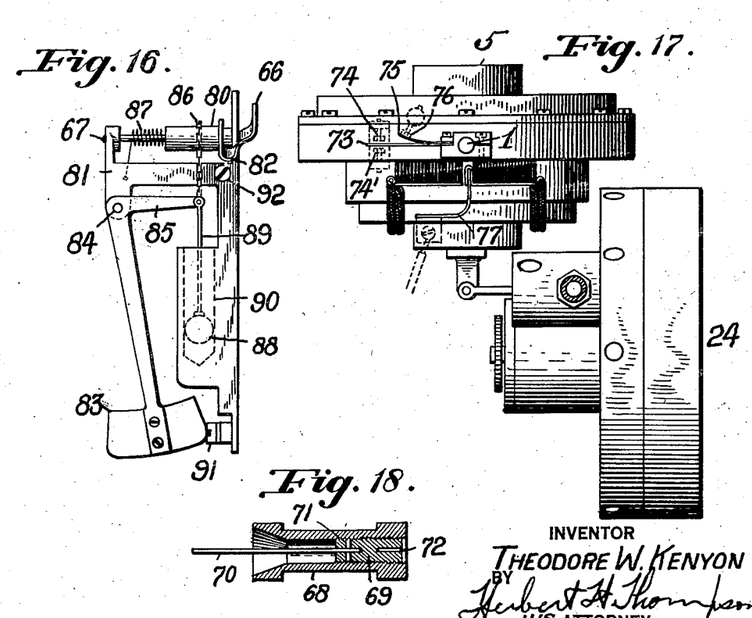
Fig. 16 is a detailed side elevation of the pendulum for actuating the pitch indicator of Fig. 1.
Fig. 17 is a plan view of a modified form of gyroscope.
Fig. 18 is a sectional detail of one of the piston valves of the engine.

The preferred construction of piston valve is shown in Fig. 18. These valves are made very small and light and are shown as made out of a hollow thimble 68 in which is threaded a small set screw 69. The piston rod 70 is shown as pinned to the screw by cross pin 71. After the screw is positioned at the proper place, the head may be slightly spread by driving a small wedge into the screw slot 72, thereby securing the screw in place.

A somewhat different form of centralizing spring for the gyroscopes is shown in Fig. 17. In this form a flat spring 73 is secured to one trunnion of the gyroscope and engages one or the other of stop pins 74 and 74' upon precession of the gyroscope. An additional curved leaf spring 75 may be provided, which normally bears against adjustable set screw 76 for the purpose of counteracting the spring effect of the lead-in wires 77 which lead current in to drive the rotor. Said wires are shown in the form of L-shaped pieces normally bent to exert a slight torque on the gyroscope in the opposite direction to spring 75, the set screw 76 being adjusted until the two torques balance (see also Fig. 19).

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A directional indicator for aircraft showing the direction and amount of deviation from course, comprising a constrained gyroscope mounted for precession through an angle proportional to the rate of turn of the craft, a hydraulic engine having a control or throttle valve connected to and operated by said gyroscope, so constructed and arranged as to cause said engine to be driven in a direction and at a rate proportional to the extent and direction of precession of said gyroscope, and a course indicator actuated by said engine.

2. A directional indicator for aircraft showing the direction and amount of deviation from course, comprising a constrained gyroscope mounted for precession through an angle proportional to the rate of turn of the craft, a hydraulic engine having a control valve connected to and operated by said gyroscope, so constructed and arranged as to cause said engine to be driven in a direction and at a rate proportional to the extent and direction of precession of said gyroscope, and a cylinder rotated about a vertical axis by said engine, rotating markings left or right in a vertical plane.

3. A directional indicator for aircraft showing the direction and amount of deviation from course, comprising a constrained gyroscope mounted for precession through an angle proportional to the rate of turn of the craft, a hydraulic engine having a control valve connected to said gyroscope, so constructed and arranged as to cause said engine to be driven in a direction and at a rate proportional to the extent and direction of precession of said gyroscope, and a compass card indicator actuated from said engine showing the course by its position.

4. A directional indicator for aircraft showing the direction and amount of deviation from course, comprising a constrained gyroscope mounted for precession through an angle proportional to the rate of turn of the craft, a hydraulic engine having a control valve connected to said gyroscope, so constructed and arranged as to cause said engine to be driven in a direction and at a rate proportional to the extent and direction of precession of said gyroscope, a cylinder driven by said engine showing by its movements the rate and direction of turn of the craft, and a compass card indicator also actuated from said engine, showing the course by its position.

5. An attitude and course indicator for aircraft comprising a pair of constrained gyroscopes mounted for precession, respectively, upon turning and tipping of the craft, a pair of motors controlled each by the precession of a respective gyroscope, an endless belt rotated transversely by the turn motor, and an endless belt rotated up or down by the tip motor, one of said belts being behind the other and visible through it.

6. An attitude and course indicator for aircraft comprising a pair of constrained gyroscopes mounted for precession, respectively, upon angular movement of the craft about two mutually normal axes, a pair of motors controlled each by the precession of a respective gyroscope, an endless belt revolved transversely by one motor, an endless belt revolved up or down by the other motor, one of said belts being behind the other and visible through it, and additional indicators actuated from said motors, showing the amount of turn and tip, respectively.

7. In an aircraft indicating instrument, an outer casing normally filled with a transparent liquid such as light oil, a motor driven pump, a hydraulic engine driven by said pump, a control valve therefor, means responsive to angular movements of the craft in one plane for actuating said valve, an indicator actuated by said engine, all of said mechanisms being sealed within said casing, and a window in said casing through which said indicator is visible.

8. The combination with a gyroscope mounted for oscillation about a single axis and having a rotor and a motor for spinning the same, of a centralizing spring for yieldingly opposing precession in either direction about said axis, lead in wires for the spinning motor having resiliency and biased to exert a small torque in one direction on the gyroscope about said axis, a second spring for exerting an opposing torque, and means for adjusting said second spring to balance the said two torques about said axis.

9. In an integrating instrument for producing motion at a rate proportional to the position of a rate of turn gyroscope, the combination with such a gyroscope, of a plurality of radially arranged cylinders and pistons, a common crank shaft therefor, a double ended distributing valve turned with said shaft and adapted to supply liquid to the cylinders in either rotational direction, and a slide valve connected to and actuated from said gyroscope so constructed and arranged as to supply the actuating liquid to one or the other end of said valve and at a rate dependent upon the position of said member.

10. A course indicator for aircraft including a rate of turn gyroscope, a multi-cylinder reversible engine, and a single slide throttle valve for said engine connected to and moved by said gyroscope in a direction and amount controlled by the direction and rate of turn.

11. A course indicator for aircraft including a rate of turn gyroscope, a hydraulic pump, a multi-cylinder reversible engine driven by said pump, and a single slide throttle valve for said engine interposed between the pump and engine and moved by said gyroscope in a direction and amount controlled by the direction and rate of turn of the craft and controlling the flow of liquid between the pump and engine.

12. A directional indicator for aircraft showing the direction and amount of deviation in the course, comprising a constrained gyroscope mounted for precession through an angle proportional to the rate of turn of the craft, a fluid motor, a reversible throttle valve controlled through precession of said gyroscope and so constructed and arranged as to cause the motor to be driven in a direction and at a rate proportional to the extent and direction of precession of said gyroscope, a compass card actuated by said motor through one revolution for one complete turn of the craft, and a resetting knob connected to said card for synchronizing it with the magnetic compass.

13. A directional indicator for aircraft showing the direction and amount of deviation in the course, comprising a constrained gyroscope mounted for precession through an angle proportional to the rate of turn of the craft, a reversible variable speed motor controlled through precession of said gyroscope and so constructed and arranged as to cause the motor to be driven in a direction and at a rate proportional to the extent and direction of precession of said gyroscope, an endless surface having appropriate indications and actuated by the motor, and a compass card also rotated by said motor through one complete revolution for a complete turn of the craft, both said card and surface being visible at the face of the instrument.

14. A course indicator presenting a checkered surface formed by separate belts movable at right angles to one another and each being subdivided by a series of parallel lines at a substantial right angle to its line of motion, a fluid motor connected to each belt, and a constrained gyroscope controlling the speed and direction of each motor respectively in accordance with the direction and degree of precession of its gyroscope.

15. A course indicator presenting a checkered surface formed by separate belts movable at right angles to one another and each being subdivided by a series of parallel lines at a substantial right angle to its line of motion, a fluid motor connected to each belt, a constrained gyroscope controlling the speed and direction of each motor respectively in accordance with the direction and degree of precession of its gyroscope, and a compass card surrounding said surface, the readings of which are controlled by one of said gyroscopes.

16. An attitude and course indicator for aircraft comprising a pair of constrained gyroscopes mounted for precession, respectively, upon angular movement of the craft about two mutually normal axes, a pair of motors controlled each by the precession of a respective gyroscope, an endless belt revolved transversely by one motor, and an endless belt revolved up or down by the other motor, one of said belts being behind the other and visible through it.

17. In an aircraft indicating instrument, an outer casing normally filled with a transparent liquid such as light oil, a pump, a plurality of hydraulic engines driven by said pump, control valves therefor, means responsive respectively to angular movements of the craft in a plurality of divergent planes for severally actuating said valves, respective indicators actuated by said engines, all of said mechanisms being sealed within said casing, and a window in said casing through which said indicators are all visible.

18. An instrument of the class described, comprising a gyro unit of the turn indicator type having means for yieldingly opposing precessional movements thereof from its normal position, a cross bar device mounted independently of the gyro unit, and means for continuously impelling said device across the face of the instrument during precession of said unit in a direction corresponding to the direction of precession and at a speed substantially proportional to the extent of precession, said means including a hydraulic engine connected to said device, and a reversing throttle valve therefor positioned by said gyro unit.

19. A direction indicator for aircraft showing the heading and the direction and amount of course deviation, comprising a closed casing having a front window, a vertical annular compass card and index visible at said window, a constrained gyroscope mounted in said casing for precession through an angle proportional to the rate of turn of the craft, a reversing speed governing controller actuated thereby, a reversible variable speed motor governed by said controller for turning one of said card or index through an angle equal to a course change, and a barred background also turned by said motor at a greater velocity than said card and visible within said card.

20. A direction indicator for aircraft showing the heading and the direction and amount of course deviation, comprising a closed casing having a front window, a vertical annular compass card and index visible at said window, a constrained gyroscope mounted in said casing for precession through an angle proportional to the rate of turn of the craft, a reversing speed governing controller actuated thereby, a reversible variable speed motor governed by said controller for turning one of said card or index through an angle equal to a course change, a barred background also turned by said motor at a greater velocity than said card and visible within said card, and a resetting knob at the face of the instrument connected to said card for synchronizing the card with the magnetic compass.

21. A course indicator for aircraft including a yieldingly centralized rate of turn gyroscope, a multi-cylinder reversible engine, and a single reversing and throttle valve for said engine connected to and moved by said gyroscope, said valve having a central standstill position and operating to turn said engine in one or the other direction dependent on the direction of precession and at a velocity proportional to the extent of precession of the gyroscope away from its centralized position.

22. A course indicator for aircraft including a yieldingly centralized rate of turn gyroscope, a multi-cylinder reversible engine, a single reversing and throttle valve for said engine connected to and moved by said gyroscope, said valve having a central standstill position and operating to turn said engine in one or the other direction dependent on the direction of precession and at a velocity proportional to the extent of precession of the gyroscope away from its centralized position, and a plurality of different indicators actuated at different speeds by said engine, the slow speed indicator showing compass headings and the high speed indicator showing by its direction and approximate amount of movement the direction and amount of course change.

THEODORE W. KENYON.